(12) United States Patent
Bolukbasi et al.

(10) Patent No.: US 6,168,142 B1
(45) Date of Patent: Jan. 2, 2001

(54) HYDRAULIC DAMPER WITH ELASTOMERIC SPRING ASSEMBLY

(75) Inventors: Akif O. Bolukbasi, Phoenix; Paul Saliba; Lowell Pester, both of Mesa, all of AZ (US)

(73) Assignee: McDonnell Douglas Helicopter Company

( * ) Notice: Under 35 U.S.C. 154(b), the term of this patent shall be extended for 0 days.

(21) Appl. No.: 09/047,961

(22) Filed: Mar. 25, 1998

(51) Int. Cl.$^7$ ............................................. F16F 5/00
(52) U.S. Cl. .................... 267/64.11; 267/226; 244/104 R
(58) Field of Search ............................ 267/64.11, 64.26, 267/64.12, 64.13, 226; 188/322.16, 322.17, 322.18; 244/104 FP, 104 R, 17.17

(56) References Cited

U.S. PATENT DOCUMENTS

| | | |
|---|---|---|
| 2,057,893 | 10/1936 | Gross . |
| 3,806,105 | 4/1974 | Knoishi et al. . |
| 4,527,674 | 7/1985 | Mourray . |
| 4,657,228 | 4/1987 | Lautzenhiser . |
| 4,838,393 | * 6/1989 | Mourray et al. ................ 188/322.17 |
| 5,158,270 | * 10/1992 | Lin ...................................... 267/226 |
| 5,248,131 | * 9/1993 | Jobelius ............................ 267/64.11 |
| 5,330,132 | * 7/1994 | Lucienne et al. .............. 244/104 FP |
| 5,437,436 | * 8/1995 | Holson et al. ........................ 267/119 |
| 5,465,811 | * 11/1995 | Katz ................................ 267/119 X |
| 5,667,041 | * 9/1997 | Jensen ................................. 188/284 |

FOREIGN PATENT DOCUMENTS

| | | |
|---|---|---|
| 36 13 677 A1 | 10/1987 | (DE) . |
| 0 458 467 A2 | 11/1991 | (EP) . |
| 2 306 141 | 5/1997 | (GB) . |

* cited by examiner

*Primary Examiner*—Douglas C. Butler
*Assistant Examiner*—Pamela J. Rodriguez
(74) *Attorney, Agent, or Firm*—Stout, Uxa, Buyan & Mullins, LLP; Donald E. Stout

(57) ABSTRACT

A hydraulic damper assembly has a barrel-piston assembly and a spring assembly. The barrel-piston assembly has a barrel with a top portion having an open end, and a piston extending through the open end. The piston has a bottom portion that is located inside the barrel. The piston and the barrel also define an annular space in which is a barrel shoulder and a piston shoulder. The barrel shoulder radially extends into the annular space from the barrel top portion. The piston shoulder radially extends into the annular space from the piston bottom portion. The spring assembly is disposed in the annular space between the barrel shoulder and the piston shoulder. When the piston is extended from the barrel, the shoulders compress the spring assembly and, thereby, reduce the amount of force required to compress the piston which enables the damper to be charged to a higher nitrogen pressure. An object of the invention is to provide a damper assembly for aircraft landing gears that permit high nitrogen pressures to increase ground resonance clearance at high aircraft gross weight and not be fully extended at low aircraft gross weights to avoid ground resonance problems. Another object of the invention is to provide a cost effective damper assembly that is easily retrofitted into current designs of helicopter landing gears.

13 Claims, 2 Drawing Sheets

HYDRAULIC DAMPER WITH ELASTOMERIC SPRING ASSEMBLY

BACKGROUND OF THE INVENTION

1. Field of the Invention

This invention relates to landing gear for aircraft, and particularly helicopters. More specifically, this invention relates to improvements in the hydraulic damper assembly that provide increased ground clearance of the helicopter under various conditions while maintaining appropriate ground resonance performance.

2. Description of the Related Art

Aircraft landing gears are typically equipped with hydraulic damper systems and struts to absorb forces during aircraft landing and to help support the aircraft while on the ground. Hydraulic damper systems are present in airplanes, helicopters, and other aircraft. Helicopter landing gears absorb the energy from landings through damper motion and elastic deformation of struts.

Helicopter landing gears have unique design requirements. The military helicopter landing gears are required to function in vertical sink speeds ranging from 8 ft/sec limit landing to 42 ft/sec crash landing conditions. In order to provide protection to the airframe, mission equipment package, and occupants in this wide range of sink speeds, multi-stage shock struts with controlled mechanical failures are utilized. Some civil helicopters utilize shock struts in combination with skid gears. Although the sink speed ranges for civil helicopters are less stringent, the kinematic constraints of the skid gears, ground resonance, static ground position, structural and economic considerations are still relevant.

One of the critical design requirements for helicopters is static ground clearance, or the ability of the landing gear to support the helicopter weight without "bottoming out." This is related to all the other design requirements of helicopter landing gear: energy absorption capability, load factor, and ground resonance. The damper assembly is one of the key gear components most influenced by the design requirements.

Static ground clearance can be increased by reducing damper stroke, which in turn can be done by increasing the pressure of the nitrogen in the damper. However, higher nitrogen pressures result in full extension of the damper under low load conditions, which is not desirable. This can be overcome by going to multistage shock struts with controlled mechanical failures, but at an increased cost.

A complication in changing damper design is that product improvements to both civil and military helicopters need to be accomplished with minimal changes to the existing landing gear configurations. The existing shock strut designs are already at the limits of current technology and, therefore, cannot be scaled to accommodate the derivative helicopters with higher gross weights without an infusion of new and innovative technologies and design approaches.

Therefore, it is desirable to have a single stage damper assembly for an aircraft landing gear that permits high nitrogen pressures to increase ground clearance at high aircraft gross weights and not be fully extended at low aircraft weights to avoid ground resonance problems.

SUMMARY OF THE INVENTION

Accordingly, it is an object of the invention to provide a damper assembly for aircraft landing gears that permit high nitrogen pressures to increase ground resonance clearance at high aircraft gross weight and not be fully extended at low aircraft gross weights to avoid ground resonance problems.

It is another object of the invention to provide a cost effective damper assembly that is easily retrofitted into current designs of helicopter landing gears.

In order to achieve this and other objects of the invention, a hydraulic damper assembly is provided having a barrel-piston assembly and a spring assembly. The barrel-piston assembly has a barrel with a top portion having an open end, and a piston extending through the open end. The piston has a bottom portion that is located inside the barrel. The piston and the barrel also define an annular space in which is a barrel shoulder and a piston shoulder. The barrel shoulder radially extends into the annular space from the barrel top portion. The piston shoulder radially extends into the annular space from the piston bottom portion. The spring assembly is disposed in the annular space between the barrel shoulder and the piston shoulder. When the piston is extended from the barrel, the shoulders compress the spring assembly and, thereby, reduce the amount of force required to compress the piston.

DESCRIPTION OF THE PREFERRED EMBODIMENTS

Figure 1:
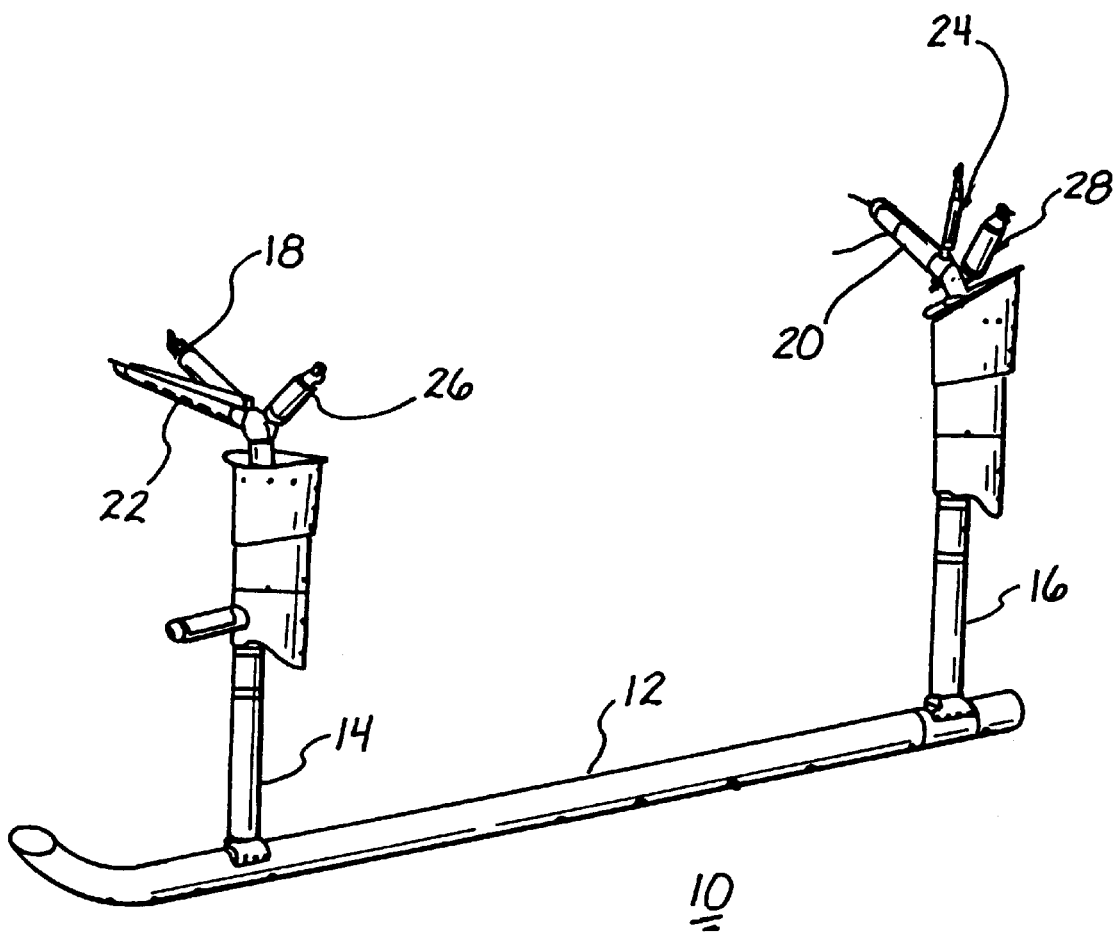
FIG. 1 is an isometric view of a portion of a typical helicopter landing gear incorporating hydraulic landing gear dampers according to an embodiment of the invention.

Referring now to the drawings, wherein like reference numerals designate corresponding structures throughout the views, and referring in particular to FIG. 1, a helicopter landing gear 10 according to an embodiment of the invention is shown. The landing gear 10 has a skid tube 12 from which radially extends a front foot 14 and a rear foot 16. The feet 14 and 16 extend to struts 18 and 20 respectively. From where the struts 18 and 20 join the feet 14 and 16, respectively, braces 22 and 24 and nitrogen-oil dampers 26 and 28 extend. The braces 22 and 24 and the dampers 26 and 28 are attached to the body of the helicopter (not shown). During landing of the helicopter, the dampers 26 and 28 absorb a portion of the landing forces.

Figures 2, 3:
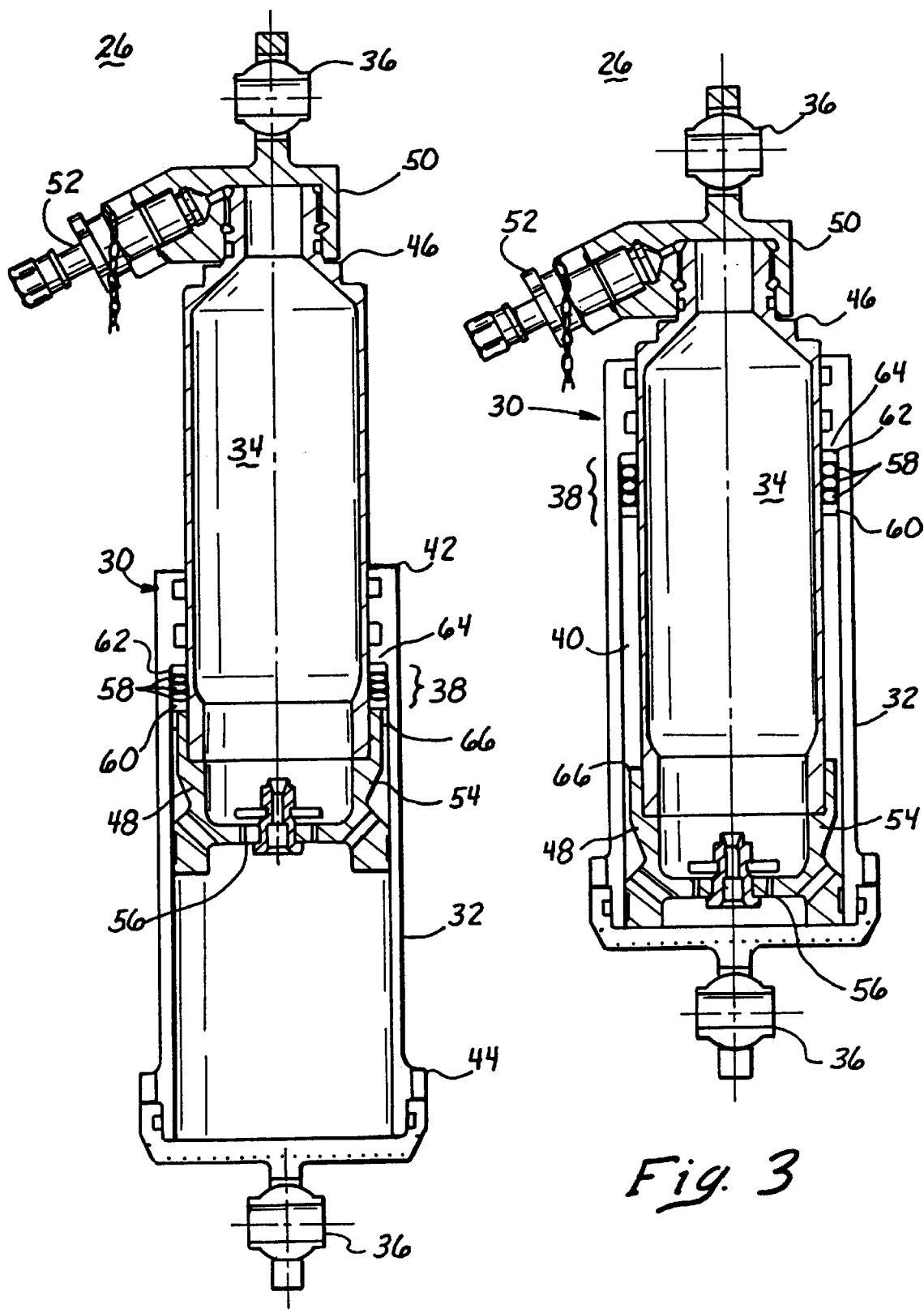
FIG. 2 is a cross sectional view of a fully extended hydraulic landing gear damper assembly according to an embodiment of the invention.
FIG. 3 is a cross sectional view of a fully compressed hydraulic landing gear damper assembly according to an embodiment of the invention.

Now referring to FIGS. 2 and 3, details of the damper 26 according to the invention are shown. As with dampers known in the art, damper 26 has a barrel-piston assembly 30 with a barrel 32 and a piston 34 therein. FIG. 2 shows the damper 26 in the fully extended position and FIG. 3 shows the damper 26 in the fully compressed position. External forces are applied at the spherical bearings 36 located at both ends of the damper 26 to move the piston 34 into the barrel 32. When there is relatively no external force applied to the damper 26, it is in the fully extended position as shown in FIG. 2. As external force is exerted on the damper 26, the piston 34 is pushed into the barrel 32. FIG. 3 shows the maximum distance, or stroke, the piston 34 can move into the barrel 32. Damper 28 in FIG. 1 has similar features to damper 26.

The damper 26 is conventional but for an elastomeric spring assembly 38. Discussing the conventional aspects of the damper 26, the barrel 32 has an open top portion 42 and a closed bottom portion 44. The piston 34 has a top portion 46 that extends through the open top portion 42 of the barrel 32, and a bottom portion 48 that is in the barrel 32. The piston top and bottom portions 46 and 48 are generally aligned with the barrel top and bottom portions 42 and 44 when the damper 26 is in the fully compressed position of FIG. 3. At the piston top portion 46 is an upper cap 50 with a nitrogen charge valve 52. At the piston bottom portion 48 is a lower cap 54 in which are hydraulic orifices 56.

The elastomeric spring assembly 38 is disposed in the annular space 40 defined by the barrel 32 and the piston 34. The spring assembly 38 of the shown embodiment is three elastomeric o-rings 58, a first annular retaining ring 60, and a second annular retaining ring 62. The o-rings 58 are disposed about the piston 34. Other embodiments of the invention may use more or less o-rings. The first retaining ring 60 is disposed between the o-rings 58 and the piston bottom portion. The second retaining ring 62 is disposed between the o-rings 58 and the barrel top portion 42.

When the damper 26 is not in the fully extended position, the o-rings 58 are in their relaxed state and have a circular cross-section, as shown in FIG. 3.

When the damper 26 is in the fully extended position, the o-rings 58 are compressed by force being applied by a barrel shoulder 64 and a piston shoulder 66, as shown in FIG. 2. More accurately, the force is applied to the retaining rings 60 and 62 which then distribute the force from the shoulders 64 and 66 evenly about the o-rings 58. The barrel shoulder 64 radially extends into the annular space 40 from the barrel top portion 42. The piston shoulder 66 radially extends into the annular space 40 from the piston bottom portion 48. In the current embodiment, the piston shoulder 66 is the lip of the lower cap 54. Other embodiments of the invention may have other arrangements for the shoulders 64 and 66. Another way of expressing the shoulder arrangement is that the barrel shoulder 64 is a means for applying force to the o-ings 58 from the barrel 32 while the piston shoulder 66 is a means for applying force to the o-rings 58 from the piston 34.

The invention encompasses many embodiments of the spring assembly 38. Other embodiments of the invention may use elastomeric coils or other elastomeric devices. In a preferred embodiment of the invention, the first retaining ring 60 is metal and the second retaining ring 62 is Teflon. In other embodiments of the invention, both rings maybe metal, or both rings maybe Teflon or some other plastic. Other alternate embodiments could employ only one ring, or have no rings. Incorporating the elastomeric spring assembly 38 into the damper 26 modifies the damper's reaction to forces. More precisely, the spring assembly 38 is a means for reducing the damper loads required to stroke the damper 26 from a fully extended position. The elastomeric spring assembly 38 reduces the net force to stroke the damper assembly from the fully extended position by the Equation (1):

$$F_{red} = K_{spr} X_{spr} \quad (1)$$

where $F_{red}$ is the amount the force stored in the assembly after compression; $K_{spr}$ is the elastomeric spring rate; and $X_{spr}$ is the elastomeric spring compression. As the force required to compress a conventional damper is:

$$F_{damper\ conventional} = (P_n - 14.7) A_n \quad (2)$$

where $P_n$ is the pressure of the nitrogen and An is the piston cross section area. The force required to stroke the damper 26 is:

$$F_{damper} = (P_n - 14.7) A_n - K_{spr} X_{spr} \quad (3)$$

As the force to stroke to the damper 26 has been reduced by $F_{red}$, for a given ground resonance load (light weight, high temperature), the damper 26 may be charged to a higher pressure. The higher nitrogen pressure in turn reduces the damper stroke and increases the static ground clearance.

In order to limit the damper dynamic loads on the landing gear assembly, the nitrogen volume is also increased along with the initial nitrogen charge pressure. The nitrogen pressure and the volume are increased in proportion such that the following relationship is satisfied at the maximum expected damper stroke:

$$(P_{inc}/P_o)(V_o/(V_o - A_n S_{max}))^k / ((V_{inc}/(V_{inc} - A_n S_{max})^k = 1.0 \quad (4)$$

where $P_{inc}$ is increased nitrogen pressure; $P_o$ is initial nitrogen pressure; $V_{inc}$ is increased nitrogen volume; $V_o$ is initial nitrogen volume; $A_n$ is piston cross section area; $S_{max}$ is maximum expected damper stroke; and k is polytropic coefficient.

Through testing of o-rings, spring rates of 3600–7150 lbs/in have been established, with corresponding spring deflections of 0.035–0.15 inch range. Analysis of the dampers with these elastomeric spring parameters indicates that a 25 to 75% increase in the helicopter static ground clearance is possible while meeting all other design criteria, including ground resonance requirements.

The present invention may be embodied in other specific forms without departing from the spirit or essential attributes. For example, the hydraulic dampers may be any suitable gas-liquid system, not only nitrogen-oil. Further, the dampers according to the invention may be used in any application that requires energy absorption, whether other aircraft, or other equipment. Accordingly, reference should be made to the appended claims, rather than to the foregoing specification, as indicating the scope of the invention.

What is claimed is:

1. A hydraulic damper assembly comprising:
   a. a barrel-piston assembly comprising:
      i. a barrel having a top portion with an open end;
      ii. a piston extending through said barrel open end, said piston having a bottom portion that is located inside said barrel; and
      iii. an annular space being defined by said barrel and said piston;
   b. a barrel shoulder extending radially into said annular space from said barrel top portion;
   c. a piston shoulder extending radially into said annular space from said piston bottom portion;
   d. a spring assembly disposed in said annular space between said barrel shoulder and said piston shoulder such that said spring assembly is compressible by said barrel shoulder and said piston shoulder when said piston is extended from said barrel, wherein said spring assembly comprises elastomeric material and the compression of said spring assembly reduces a net force required to initiate a stroke of said damper assembly compared to the same damper assembly without the spring assembly;
   e. a first annular retaining ring disposed between said spring assembly and said piston shoulder; and
   f. a second annular retaining ring disposed between said spring assembly and said barrel shoulder;
   wherein said first and second annular retaining rings do not contact one another even when said piston is fully extended from said barrel.

2. The damper assembly of claim 1, wherein said elastomeric material comprises at least one elastomeric o-ring disposed about said piston.

3. The damper assembly of claim 1, wherein said elastomeric material comprises an elastomeric coil disposed about said piston.

4. The damper assembly of claim 1, wherein said first and second retaining rings are plastic or metal.

5. The damper assembly of claim 1, wherein:
   a. said first retaining ring is metal; and
   b. said second retaining ring is Teflon.

6. The damper assembly of claim 5, wherein said spring assembly comprises at least one elastomeric o-ring disposed about said piston.

7. The damper assembly of claim 1, wherein said damper assembly is installed in an aircraft landing gear assembly.

8. The damper assembly of claim 7, where said aircraft comprises a helicopter.

9. A hydraulic damper assembly comprising:
   a. a barrel-piston assembly comprising:
      i. a barrel having a top portion with an open end;
      ii. a piston extending through said barrel open end, said piston having a bottom portion that is located inside said barrel; and
      iii. an annular space being defined by said barrel and said piston;
   b. a barrel shoulder extending radially into said annular space from said barrel top portion;
   c. a piston shoulder extending radially into said annular space from said piston bottom portion;
   d. at least one elastomeric o-ring disposed about said piston, in said annular space between said barrel shoulder and said piston shoulder such that said o-ring is compressible by said barrel shoulder and said piston shoulder when said piston is extended from said barrel;
   e. a first annular retaining ring disposed between said elastomeric o-ring and said piston shoulder; and
   f. a second annular retaining ring disposed between said elastomeric o-ring and said barrel shoulder;
   wherein said first and second annular retaining rings do not contact one another even when said piston is fully extended from said barrel.

10. A hydraulic damper assembly that permits higher gas pressures due to reduces net stroke force, said assembly comprising:
    a. a barrel-piston assembly comprising:
       i. a barrel having a top portion with an open end;
       ii. a piston extending through said barrel open end, said piston having a bottom portion that is located inside said barrel; and
       iii. an annular space being defined by said barrel and said piston;
    b. a barrel shoulder extending radially into said annular space from said barrel top portion;
    c. a piston shoulder extending radially into said annular space from said piston bottom portion;
    d. damper load reducing means comprising elastomeric material, for reducing the damper loads required to stroke said damper assembly from an extended position disposed in said annular space;
    said damper load reducing means including a first annular retaining ring being disposed between said elastomeric material and said piston shoulder and a second annular retaining ring disposed between said elastomeric material and said barrel shoulder, wherein said first and second annular retaining rings do not contact one another even when said piston is fully extended from said barrel.

11. The damper assembly of claim 10, wherein said damper load reducing means reduces the net force to stroke the damper assembly by the equation:

$$F_{red} = K_{spr} X_{spr} \qquad (1)$$

where Fred is the amount the force required to stroke the damper assembly; $K_{spr}$ is the elastomeric spring rate of the damper load reducing means; and $X_{spr}$ is the elastomeric spring compression of the damper load reducing means.

12. The damper assembly of claim 10, wherein said damper assembly is installed in an aircraft landing gear assembly.

13. The damper assembly of claim 12, wherein said aircraft comprises a helicopter.

* * * * *